(12) United States Patent
Baumeister

(10) Patent No.: US 12,070,911 B2
(45) Date of Patent: Aug. 27, 2024

(54) STRETCHING UNIT FOR CLAMPING AND STRETCHING A TUBULAR FILM, FLOW-WRAPPER AND METHOD FOR CLAMPING AND STRETCHING A TUBULAR FILM

(71) Applicant: GEA Food Solutions Weert B.V., RV Weert (NL)

(72) Inventor: Bruno Gerfried Baumeister, Aachen (DE)

(73) Assignee: GEA FOOD SOLUTIONS WEERT B.V., RV Weert (NL)

( * ) Notice: Subject to any disclaimer, the term of this patent is extended or adjusted under 35 U.S.C. 154(b) by 199 days.

(21) Appl. No.: 17/635,414

(22) PCT Filed: Sep. 9, 2020

(86) PCT No.: PCT/EP2020/075177
§ 371 (c)(1),
(2) Date: Feb. 15, 2022

(87) PCT Pub. No.: WO2021/048193
PCT Pub. Date: Mar. 18, 2021

(65) Prior Publication Data
US 2022/0266540 A1    Aug. 25, 2022

(30) Foreign Application Priority Data
Sep. 9, 2019 (EP) ..................... 19196135

(51) Int. Cl.
*B29C 65/00* (2006.01)
*B65B 9/20* (2012.01)
*B65B 9/207* (2012.01)

(52) U.S. Cl.
CPC ........ *B29C 66/4312* (2013.01); *B29C 66/344* (2013.01); *B29C 66/849* (2013.01); *B65B 9/2049* (2013.01); *B65B 9/207* (2013.01)

(58) Field of Classification Search
CPC . B29C 66/849; B29C 66/4312; B29C 66/344; B65B 9/2049; B65B 9/207
See application file for complete search history.

(56) References Cited

U.S. PATENT DOCUMENTS

| 2,751,732 A | 6/1956 | Woppman |
| 4,534,159 A | 8/1985 | Kelly |

(Continued)

FOREIGN PATENT DOCUMENTS

| CN | 206187463 U | 5/2017 |
| CN | 209079050 U | 7/2019 |

(Continued)

OTHER PUBLICATIONS

International Search Report and Written Opinion mailed on Nov. 25, 2020, for International Application PCT/EP2020/075177.

(Continued)

*Primary Examiner* — Andrew M Tecco
*Assistant Examiner* — Nicholas E Igbokwe
(74) *Attorney, Agent, or Firm* — The Dobrusin Law Firm, P.C.

(57) ABSTRACT

A stretching unit for clamping and stretching a tubular film in a flow-wrapper, the stretching unit includes: a gripping head; two coupling rods attached to a moving means; two gripping fingers, each of the gripping fingers is attached to the gripping head and to one of the coupling rods; the gripping fingers are moved from a remote position to a clamping position by a relative linear movement between the gripping head and the moving means parallel to a center axis of the moving means.

20 Claims, 3 Drawing Sheets

(56) References Cited

U.S. PATENT DOCUMENTS

| | | | | |
|---|---|---|---|---|
| 4,829,745 A | * | 5/1989 | Behr | B65B 9/2035 |
| | | | | 53/551 |
| 4,869,048 A | * | 9/1989 | Boeckmann | B65B 9/2028 |
| | | | | 53/481 |
| 7,546,722 B2 | * | 6/2009 | Tsuruta | B29C 66/8225 |
| | | | | 53/551 |
| 9,878,444 B1 | * | 1/2018 | Harrington | A47F 13/06 |
| 2002/0104292 A1 | * | 8/2002 | Tsuruta | B65B 9/2028 |
| | | | | 53/551 |
| 2010/0147882 A1 | * | 6/2010 | Bohler | B65B 9/20 |
| | | | | 53/558 |

FOREIGN PATENT DOCUMENTS

| | | |
|---|---|---|
| EP | 1228964 A1 | 8/2002 |
| FR | 2158743 A5 | 6/1973 |
| GB | 2206556 A | 1/1989 |
| WO | 02/10019 A1 | 2/2002 |

OTHER PUBLICATIONS

Chinese Office Action dated Apr. 28, 2023, for Chinese Application 202080061856.3.

* cited by examiner

STRETCHING UNIT FOR CLAMPING AND STRETCHING A TUBULAR FILM, FLOW-WRAPPER AND METHOD FOR CLAMPING AND STRETCHING A TUBULAR FILM

CROSS REFERENCE TO RELATED APPLICATIONS

This patent application is a U.S. National Phase application under 35 U.S.C. § 371 of International Application No. PCT/EP2020/075177, filed on Sep. 9, 2020 and which claims the benefit and priority of EP 19196135.8 filed on Sep. 9, 2019.

FIELD

The invention relates to improvements of a stretching unit for clamping and stretching a tubular film in a flow-wrapper, the stretching unit comprising a gripping head, two coupling rods attached to a moving means, two gripping fingers, each gripping finger attached to the gripping head and to one coupling rod. The invention also relates to a flow-wrapper and a method to clamp and stretch a tubular film.

BACKGROUND

A common method of producing packages out of a film web is the use of a flow-wrapper. A flow-wrapper, also called flow wrapping machine, is a packaging machine that receives a continuous plane sheet, for example a film of plastic material, e.g., a thermoplastic material, which is transported continuously or intermittently and passed downwardly over a form shoulder and is then shaped into a tubular form, i.e. into a tubular film, by being wrapped around a vertical form-fill tube of the flow-wrapper. After being wrapped around the vertical form-fill tube, the film web is longitudinally closed by means of a longitudinally extending seal, which is applied to the film especially by heat sealing the lateral/longitudinal margins of the film web or by heat sealing in the vicinity of these margins thereby joining them. This is carried out by so called longitudinal-sealing means. The tubular film has conventionally a rectangular, elliptical or a circular cross-sectional area. Conventionally, the tubular film is closed by cross-sealing means, preferably in a direction perpendicular to the direction of flow, i.e. transversely. Thereby, individual packages are defined out of the continuous tubular film. A product, such as a foodstuff, is introduced by dropping the product through a form-fill tube and into the tubular film surrounding the form-fill-tube. During filling, the tubular film is transversely open at its upper end, i.e. not cross-sealed.

Thereafter and/or simultaneously, the tubular film together with the product is moved downwardly and then a top cross-seal is formed above the product and thereby a hermetically closed package produced. As a last step or simultaneously to the application of the top seal, the package is separated from the tubular film by cutting means. To create a straight and tight cross-seal, the tubular film must be stretched along the area to be cross-sealed before and during cross-sealing. For this purpose, stretching units are usually used, which drive two gripper fingers with a first pneumatic drive to clamp the tubular film. Once the tubular film is clamped, a start signal is sent to a second pneumatic drive, whereupon the second pneumatic drive moves the gripper fingers to stretch the clamped tubular film. However, this is time-consuming and complicated due to the two separate movements and the need to wait until the end of the clamping process before the start signal indicates that the stretching process can be started.

SUMMARY

The purpose of the invention is therefore to provide a stretching unit, a vertical flow-wrapper, and a method, which allows clamping and stretching a tubular film without the need to wait until a start signal indicates that the tubular film has been clamped before stretching the film.

The purpose is attained by providing a stretching unit for clamping and stretching a tubular film in a flow-wrapper. The stretching unit comprises a gripping head, two coupling rods attached to a moving means, two gripping fingers, each gripping finger attached to the gripping head and to one coupling rod. The gripping fingers are moved from a remote position to a clamping position by a relative linear movement between the gripping head and the moving means parallel to a center axis of the moving means.

The disclosure regarding this embodiment of the present invention also applies to the other embodiments of the present invention and vice versa. Subject matters disclosed regarding this embodiment of the present invention can also be combined with other subject matters disclosed regarding this and/or other embodiments of the present invention and vice versa.

The present invention relates to a stretching unit for clamping and stretching a tubular film in a flow-wrapper, the stretching unit comprising a gripping head, two coupling rods attached to a moving means, two gripping fingers, each gripping finger attached to the gripping head and to one coupling rod. A flow-wrapper receives a continuous plane sheet, e.g. a film of plastic material, e.g. a thermoplastic material, which is transported continuously or intermittently and passed downwardly over a form shoulder and is then shaped into a tubular form, i.e. into a tubular film, by being wrapped around a vertical form-fill tube of the flow-wrapper. After being wrapped around the vertical form-fill tube, the film web is longitudinally closed by means of a longitudinally extending seal which is applied to the film especially by heat sealing the lateral/longitudinal margins of the film web or by heat sealing in the vicinity of these margins thereby joining them. This is carried out by so called longitudinal-sealing means. The tubular film has conventionally a rectangular, elliptical or a circular cross-sectional area. Conventionally, the tubular film is closed by cross-sealing means, preferably in a direction perpendicular to the direction of flow, i.e. transversely. Thereby, individual packages are defined out of the continuous tubular film. A product, such as a foodstuff, is introduced into the tubular film by dropping the product through a form-fill tube and into the tubular film surrounding the form-fill tube and onto a lower-, first cross seal. During filling the tubular film is transversely open at its upper, top end, i.e. not cross-sealed. Thereafter and/or simultaneously, the tubular film together with its product is moved downwardly and then a top cross-seal is formed above the product and thereby the hermetically closed package produced. As a last step or simultaneously to the application of the top seal, the package is separated from the tubular film by cutting means. To create a straight and tight cross-seal, the tubular film is stretched along the area to be cross-sealed before and during cross-sealing by a stretching unit of the flow-wrapper. For clamping and stretching the tubular film, the stretching unit comprising two coupling rods attached to a moving means of the stretching unit, two gripping fingers, each gripping finger attached to a gripping head of the stretching unit and to one coupling rod.

According to the present invention, the gripping fingers are moved from a remote position to a clamping position by a relative linear movement between the gripping head and the moving means parallel to a center axis of the moving means. Due to the movement parallel to the center axis of the moving means, the tubular film is both, clamped and stretched, in one working operation. The inventive stretching unit eliminates the need to separate the steps of clamping and stretching and wait for a start signal, indicating that the tubular film is clamped, before stretching the tubular film.

The coupling rods are preferably arranged in a V-shaped manner. Preferably, the coupling rods are arranged in a plane that is parallel to the center axis of the moving means. Preferably, the coupling rods are rotatably connected to the moving means, more preferably at a first end of the coupling rods. It is preferable that the coupling rods are connected to the moving means via third pivot points at the first end of the coupling rods. The gripping fingers are preferably connected to the coupling rods at a second end of the coupling rods, wherein the second end is opposed to the first end. Preferably, the gripping fingers are connected to the coupling rods via second pivot points. The gripping fingers are preferably arranged on the side of the coupling rods facing away from the gripping head. Preferably, the gripping fingers are rotatably connected to the gripping head via first pivot points. The first pivot point is preferably arranged at a second end of the gripping head, the second end opposing a first end of the gripping head, wherein the first end of the gripping head is preferably arranged adjacent or at least partially enclosing the moving means.

Preferably the gripping head partially encloses the coupling rods. Preferably, the gripping head at least partially covers the upper side and/or the lower side of the coupling rods as well as the sides of the coupling rods that are turned away from the respective other coupling rod. The gripping head is preferably Y-shaped or U-shaped or V-shaped.

Another inventive or preferred embodiment of the present invention which also solves the stated problem is a stretching unit for clamping and stretching a tubular film in a flow-wrapper. The stretching unit comprises a gripping head, two coupling rods attached to a moving means, two gripping fingers, each gripping finger attached to the gripping head and to one coupling rod. The gripping fingers are moved from a remote position to a clamping position by a relative linear movement between the gripping head and the moving means parallel to a center axis of the moving means.

The disclosure regarding this embodiment of the present invention also applies to the other embodiments of the present invention and vice versa. Subject matters disclosed regarding this embodiment of the present invention can also be combined with other subject matters disclosed regarding this and/or other embodiments of the present invention and vice versa.

This embodiment of the present invention relates to a stretching unit for clamping and stretching a tubular film in a flow-wrapper, the stretching unit comprising a gripping head, two coupling rods attached to a moving means, two gripping fingers, each gripping finger attached to the gripping head and to one coupling rod.

According to this embodiment of the present invention, the gripping fingers are moved from a remote position to a clamping position by a rotational movement of the gripping fingers. Due to the rotational movement of the gripping fingers, a smooth transition between clamping and stretching is enabled. The inventive stretching unit eliminates the need to separate the steps of clamping and stretching and wait for a start signal, indicating that the tubular film is clamped, before stretching the tubular film.

The coupling rods are preferably arranged in a V-shaped manner. Preferably, the coupling rods are arranged in a plane that is parallel to the center axis of the moving means. Preferably, the coupling rods are rotatably connected to the moving means, more preferably at a first end of the coupling rods. It is preferable that the coupling rods are connected to the moving means via third pivot points at the first end of the coupling rods. The gripping fingers are preferably connected to the coupling rods at a second end of the coupling rods, wherein the second end is opposed to the first end. Preferably, the gripping fingers are connected to the coupling rods via second pivot points. The gripping fingers are preferably arranged on the side of the coupling rods facing away from the gripping head. Preferably, the gripping fingers are rotatably connected to the gripping head via first pivot points. The first pivot point is preferably arranged at a second end of the gripping head, the second end opposing a first end of the gripping head, wherein the first end of the gripping head is preferably arranged adjacent or at least partially enclosing the moving means.

Preferably the gripping head partially encloses the coupling rods. Preferably, the gripping head at least partially covers the upper side and/or the lower side of the coupling rods as well as the the sides of the coupling rods, which are turned away from the respective other coupling rod. The gripping head is preferably Y-shaped or U-shaped or V-shaped.

Preferably, the coupling rods and/or the gripping fingers and/or the gripping head and/or the moving means are made of metal or plastic.

According to a preferred embodiment of the invention, each gripping finger, preferably at one of its end sections, is attached to the gripping head by a first pivot point and each gripping finger is attached to the coupling rods by a second pivot point. The relative linear movement between the gripping head and the moving means results in a rotational movement of the gripping fingers around the first pivot point and thus to a transition from the remote position to the clamping position or back. Preferably, each coupling rod is attached to the moving means by a third pivot point.

According to a preferred embodiment of the invention, the moving means is attached to a first driving means, wherein the first driving means is preferably a pneumatic cylinder. Alternatively, the first driving means is an electric motor, preferably a linear motor.

According to a preferred embodiment of the invention, the gripping head is connected to a second driving means, wherein the second driving means is preferably an electric motor, more preferably a linear motor, even more preferably a linear servo motor. Compared to e.g., pneumatic cylinders, a linear motor and hence the stretching is extremely precisely controllable. The position of the gripping head driven by the linear motor, preferably a linear servo motor is preferably always known without the need for an additional sensor. Furthermore, the linear motor enables high forces to be applied and prevents slipping. Since the linear motor can be controlled precisely, the stretching force can be adjusted to the material properties of the tubular film and/or different bag shapes. With the linear motor, a rupture of the tubular film can be avoided.

Preferably, the moving means is a driven rod. Preferably, the gripping head is attached to the second driving means via a further moving means. The further moving means is preferably a tube. The tube is preferably arranged parallel to the moving means and at least partially coaxial with the moving means. This enables an advantageous transmission of power from the second driving means to the gripping head while minimizing the installation space and allowing a relatively free choice of the location of the second driving means. The further moving means is preferably made of a metal and/or a synthetic material.

According to a preferred embodiment of the invention, a movement of the moving means along the center axis of the moving means is limited by a mechanical stop. Preferably, a movement of the moving means towards the tubular film is limited by the mechanical stop. Preferably, the movement is limited to limit the rotation of the gripping fingers to the intermediate position. This advantageously limits the movement of the moving means, preventing malfunctions and/or damages to the stretching unit by e.g., flipping of the gripping fingers. Preferably, the position of the mechanical stop is adjustable in a direction parallel to the center axis of the moving means. Preferably, the position of the mechanical stop is adjusted according to the size and/or the form of the tubular film and/or the packages.

The problem of the invention is also attained by providing a flow-wrapper.

The disclosure regarding this embodiment of the present invention also applies to the other embodiments of the present invention and vice versa. Subject matters disclosed regarding this embodiment of the present invention can also be combined with other subject matters disclosed regarding this and/or other embodiments of the present invention and vice versa.

This embodiment of the present invention relates to a flow-wrapper. A flow-wrapper receives a continuous plane sheet, e.g. a film of plastic material, e.g. a thermoplastic material, which is transported continuously or intermittently and passed downwardly over a form shoulder and is then shaped into a tubular form, i.e. into a tubular film, by being wrapped around a vertical form-fill tube of the flow-wrapper. After being wrapped around the vertical form-fill tube, the film web is longitudinally closed by means of a longitudinally extending seal which is applied to the film especially by heat sealing the lateral/longitudinal margins of the film web or by heat sealing in the vicinity of these margins thereby joining them. This is carried out by so called longitudinal-sealing means. The tubular film has conventionally a rectangular, elliptical or a circular cross-sectional area. Conventionally, the tubular film is closed by cross-sealing means, preferably in a direction perpendicular to the direction of flow, i.e. transversely. Thereby, individual packages are defined out of the continuous tubular film. A product, such as a foodstuff, is introduced into the tubular film by dropping the product through a form-fill tube and into the tubular film surrounding the form-fill tube and onto a lower-, first cross seal. During filling the tubular film is transversely open at its upper, top end, i.e. not cross-sealed. Thereafter and/or simultaneously, the tubular film together with its product is moved downwardly and then a top cross-seal is formed above the product and thereby the hermetically closed package produced. As a last step or simultaneously to the application of the top seal, the package is separated from the tubular film by cutting means. To create a straight and tight cross-seal, the tubular film is stretched along the area to be cross-sealed before and during cross-sealing by a stretching unit of the flow-wrapper. For clamping and stretching the tubular film, the stretching unit comprising two coupling rods attached to a moving means of the stretching unit, two gripping fingers, each gripping finger attached to a gripping head of the stretching unit and to one coupling rod.

According to the present embodiment of the invention, the flow-wrapper comprises an inventive stretching unit. The inventive stretching unit eliminates the need to separate the steps of clamping and stretching and wait for a start signal, indicating that the tubular film is clamped, before stretching the tubular film.

Preferably, the stretching unit is attached movably in the flow-wrapper. Preferably, the stretching unit is movable along a transport direction of the tubular film. This makes it possible to operate the flow-wrapper continuously, i.e. continuously transporting film material into the flow-wrapper instead of intermittently transporting film material into the flow-wrapper. For this purpose, the stretching unit as well as the cross-sealing means are preferably moved parallel to the tubular film during clamping, stretching and cross-sealing.

Preferably, the cross-sealing means are mounted on a movable cross-sealing mounting. Preferably, the cross-sealing mounting is movable along and against the transport direction of the tubular film. Preferably, the stretching unit is connected to the cross-sealing mounting. Preferably, the cross-sealing mounting is moved in a paternoster-lift-like movement along and against the transport direction of the tubular film, wherein clamping, stretching, and cross-sealing is executed during a movement along the transport direction of the tubular film.

The problem of the invention is also attained by providing a method for clamping and stretching a tubular film in a flow-wrapper utilizing a stretching unit, preferably a stretching unit according to the present invention, by moving two gripping fingers of the stretching unit from an initial position to a clamping position. In a first step, a moving means of the stretching unit is moved relative to a gripping head of the stretching unit in a first direction, preferably towards the tubular film. Thereby the gripping fingers are moved from the remote position to an intermediate position. In a second step, the gripping head is moved relative to the moving means in a second direction, which is opposite to the first direction. Thereby the gripping fingers are moved from the intermediate position to the clamping position. Thereby the tubular film is clamped. The tubular film is stretched by a further movement of the gripping head in the second direction.

The disclosure regarding this embodiment of the present invention also applies to the other embodiments of the present invention and vice versa. Subject matters disclosed regarding this embodiment of the present invention can also be combined with other subject matters disclosed regarding this and/or other embodiments of the present invention and vice versa.

This embodiment of the present invention relates to a method for clamping and stretching a tubular film in a flow-wrapper. A flow-wrapper receives a continuous plane sheet, e.g. a film of plastic material, e.g. a thermoplastic material, which is transported continuously or intermittently and passed downwardly over a form shoulder and is then shaped into a tubular form, i.e. into a tubular film, by being wrapped around a vertical form-fill tube of the flow-wrapper. After being wrapped around the vertical form-fill tube, the film web is longitudinally closed by means of a longitudinally extending seal which is applied to the film especially by heat sealing the lateral/longitudinal margins of the film web or by heat sealing in the vicinity of these margins thereby joining them. This is carried out by so called longitudinal-sealing means. The tubular film has conventionally a rectangular, elliptical or a circular cross-sectional area. Conventionally, the tubular film is closed by cross-sealing means, preferably in a direction perpendicular to the direction of flow, i.e. transversely. Thereby, individual packages are defined out of the continuous tubular film. A product, such as a foodstuff, is introduced into the tubular film by dropping the product through a form-fill tube and into the tubular film surrounding the form-fill tube and onto a lower-, first cross seal. During filling the tubular film is transversely open at its upper, top end, i.e. not cross-sealed. Thereafter and/or simultaneously, the tubular film together with its product is moved downwardly and then a top cross-seal is formed above the product and thereby the hermetically closed package produced. As a last step or simultaneously to the application of the top seal, the package is separated from the tubular film by cutting means. To create a straight and tight cross-seal, the tubular film is stretched along the area to be cross-sealed before and during cross-sealing by a stretching unit of the flow-wrapper. For clamping and stretching the tubular film, the stretching unit comprising two coupling rods attached to a moving means of the stretching unit, two gripping fingers, each gripping finger attached to a gripping head of the stretching unit and to one coupling rod.

According to the present invention, in a first step, a moving means of the stretching unit is moved relative to a gripping head of the stretching unit in a first direction, preferably towards the tubular film. Thereby the gripping fingers are moved from the remote position to an intermediate position. In a second step, the gripping head is moved relative to the moving means in a second direction, which is opposite to the first direction. Thereby the gripping fingers are moved from the intermediate position to the clamping position clamping the tubular film. The tubular film is stretched by a further movement of the gripping head in the second direction. Due to the movement in the second direction, the tubular film is both, clamped and stretched, in one working operation. The inventive method eliminates the need to separate the steps of clamping and stretching and wait for a start signal, indicating that the tubular film is clamped, before stretching the tubular film. Preferably, the second direction is arranged parallel to the center axis of the moving means. Preferably, the tubular film is released by the stretching unit when the tubular film is cross-sealed. Preferably, for releasing the tubular film, in a third step, the moving head is moved relative to the moving means in the first direction and thereby moving the gripping fingers from the clamping position to the intermediate position. Preferably, the moving means is fixed in its position during the third step. Preferably, the third step follows the second step. Preferably, in a fourth step, the moving means is moved relative to the gripping head in the second direction and thereby moving the gripping fingers from the intermediate position to the remote position. Preferably, the fourth step follows the third step.

Another inventive or preferred embodiment of the present invention which also solves the stated problem is a method for clamping and stretching a tubular film in a flow-wrapper utilizing a stretching unit, preferably stretching unit according to the present invention, by moving two gripping fingers of the stretching unit from a remote position to a clamping position. In a first step, the gripping fingers are rotated in a gripping plane orthogonal to a transport direction of the tubular film towards each other from the remote position to an intermediate position. In a second step, the gripping fingers are rotated in the gripping plane towards each other from the intermediate position to the clamping position. The tubular film is clamped between the gripping fingers. The gripping fingers are linearly moved in the gripping plane to stretch the clamped tubular film.

The disclosure regarding this embodiment of the present invention also applies to the other embodiments of the present invention and vice versa. Subject matters disclosed regarding this embodiment of the present invention can also be combined with other subject matters disclosed regarding this and/or other embodiments of the present invention and vice versa.

This embodiment of the present invention relates to a method for clamping and stretching a tubular film in a flow-wrapper. A flow-wrapper receives a continuous plane sheet, e.g. a film of plastic material, e.g. a thermoplastic material, which is transported continuously or intermittently and passed downwardly over a form shoulder and is then shaped into a tubular form, i.e. into a tubular film, by being wrapped around a vertical form-fill tube of the flow-wrapper. After being wrapped around the vertical form-fill tube, the film web is longitudinally closed by means of a longitudinally extending seal which is applied to the film especially by heat sealing the lateral/longitudinal margins of the film web or by heat sealing in the vicinity of these margins thereby joining them. This is carried out by so called longitudinal-sealing means. The tubular film has conventionally a rectangular, elliptical or a circular cross-sectional area. Conventionally, the tubular film is closed by cross-sealing means, preferably in a direction perpendicular to the direction of flow, i.e. transversely. Thereby, individual packages are defined out of the continuous tubular film. A product, such as a foodstuff, is introduced into the tubular film by dropping the product through a form-fill tube and into the tubular film surrounding the form-fill tube and onto a lower-, first cross seal. During filling the tubular film is transversely open at its upper, top end, i.e. not cross-sealed. Thereafter and/or simultaneously, the tubular film together with its product is moved downwardly along a transport direction and then a top cross-seal is formed above the product and thereby the hermetically closed package produced. As a last step or simultaneously to the application of the top seal, the package is separated from the tubular film by cutting means. To create a straight and tight cross-seal, the tubular film is stretched along the area to be cross-sealed before and during cross-sealing by a stretching unit of the flow-wrapper. For clamping and stretching the tubular film, the stretching unit comprising two coupling rods attached to a moving means of the stretching unit, two gripping fingers, each gripping finger attached to a gripping head of the stretching unit and to one coupling rod.

According to the present invention, in a first step, the gripping fingers are rotated in a gripping plane orthogonal to a transport direction of the tubular film towards each other from the remote position to an intermediate position. In a second step, the gripping fingers are rotated in the gripping plane towards each other from the intermediate position to the clamping position, wherein the tubular film is clamped between the gripping fingers. The gripping fingers are linearly moved in the gripping plane to stretch the clamped tubular film. Due to the rotational movement of the gripping fingers, a smooth transition between clamping and stretching is enabled. The inventive method eliminates the need to separate the steps of clamping and stretching and wait for a start signal, indicating that the tubular film is clamped, before stretching the tubular film. Preferably, the tubular film is released by the stretching unit when the tubular film is cross-sealed. Preferably, for releasing the tubular film, in a third step, the gripping fingers are rotated in the gripping plane away from each other from the clamping position to the intermediate position, wherein the tubular film is released. Preferably, the gripping fingers are linearly moved in the gripping plane contrary to the linear movement of the gripping fingers in the first step. Preferably, the gripping fingers are rotated away from each other from the intermediate position to the remote position in a fourth step. Preferably, the second step is followed by the third step. Preferably, the third step is followed by the fourth step.

Preferably, the tubular film is not clamped between the gripping fingers in the remote position and in the intermediate position. It is thereby advantageously enabled, that the tubular film can pass the stretching unit without risk of damaging the tubular film.

According to a preferred embodiment of the invention, a rotation of the gripping fingers in the gripping plane and stretching is caused by a relative movement between the gripping head and the moving means parallel to a center axis of the moving means. Preferably, the relative movement between the gripping head and the moving means parallel to a center axis of the moving means causes a relative movement of the first rotary joints and the second rotary joints, by which the rotation of the gripping fingers is caused.

Preferably, the gripping head is moved by an electric motor, a linear motor, more preferably a linear servo motor. Preferably, the moving means is moved by a pneumatic cylinder. A linear motor and hence the stretching is extremely precisely controllable. The position of the gripping head driven by the linear motor, preferably a linear servo motor is preferably always known without the need for an additional sensor. Furthermore, the linear motor enables high forces to be applied and prevents slipping. Since the linear motor can be controlled precisely, the stretching force can be adjusted to the material properties of the tubular film and/or different bag shapes. With the linear motor, a rupture of the tubular film can be avoided.

Preferably, a driving force of the electric motor and/or the linear motor and/or the linear servo motor is controlled depending on material properties and/or a geometry of the tubular film. It is thereby advantageously possible to adapt the stretching force to an optimal force, which ensures that the tubular film is stretched properly and further provides that the tubular film is not ruptured.

Preferably, in the second step, the movement of the gripping head in the second direction is limited, wherein the movement of the gripping head in the second direction is preferably limited by a path setting of the electric motor and/or the linear motor and/or the linear servo motor. This makes it possible to prevent the tubular film from being torn. The position of the gripping head is preferably known from the status of the electric motor and/or the linear motor and/or the linear servo motor. Preferably, the path setting is adapted to material properties and/or a geometry of the tubular film.

Preferably during the second step, the movement of the gripping head is limited, wherein more preferably, the movement of the gripping head in the second direction is limited. Preferably, the movement is limited by a maximum force/torque setting of the electric motor and/or the linear motor and/or the linear servo motor. As soon as this maximum setting is reached, the movement is stopped.

Further details, features and advantages of the present invention are described by the drawings and by the following description of preferred embodiments on the basis of the drawings. The drawings illustrate only exemplary embodiments of the present invention, which do not restrict the essential idea of the invention.

DETAILED DESCRIPTION

In the different figures the same parts are always provided with the same reference signs and are therefore usually named or mentioned only once.

Figure 1:
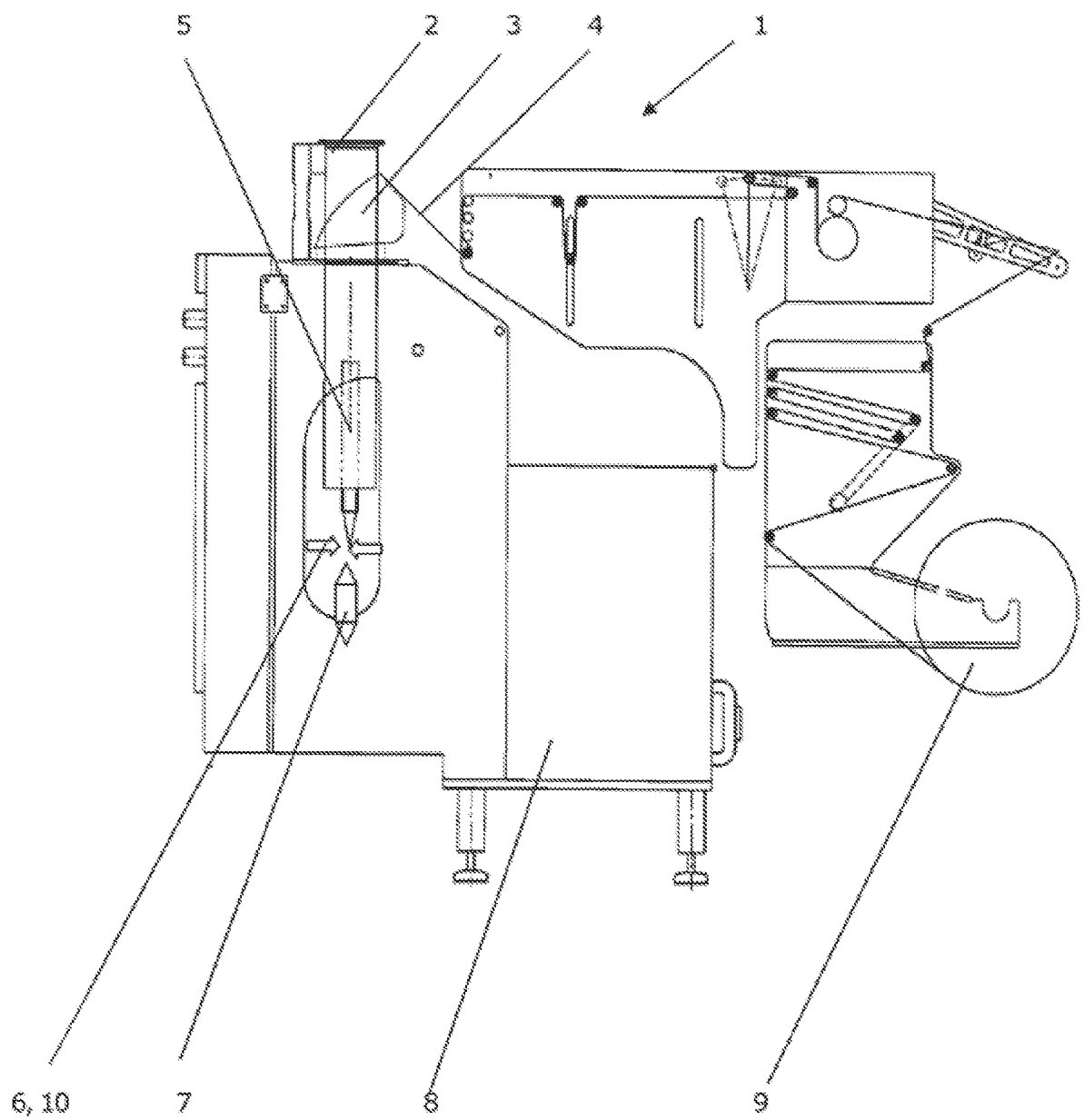
FIG. 1 schematically illustrates a flow-wrapper according to a preferred embodiment of the present invention.

In FIG. 1, the flow-wrapper 1 according to the invention is schematically shown. A flow wrapper 1 is a packaging machine, which forms a plane film web 4 into a tubular film 4, which is transported along a form-fill tube 2. Two ends of this tubular film 4 are sealed together by a longitudinal sealing means 5. Subsequently, the packaging item is filled into the tubular film 4 and a cross-seal is applied to the tubular film 4 to close the package. Simultaneously or after applying the cross-seal, the finalized packages 7 are cut off the tubular film 4. The flow-wrapper 1 comprises a frame/ housing 8, at which a form shoulder 3, a form-fill tube 2 and longitudinal sealing means 5 and cross-sealing means 6 are provided. The flow-wrapper 1 may comprise gusset-forming means to form the bottom and/or the top of each package.

A web of a film 4, especially a weldable plastic film 4, is supplied from a reel 9, which supplies the plane film 4 continuously or intermittently to a form shoulder 3, which shapes the film web 4 into a rather tubular form around a form-fill tube 2. In the context of the present invention, a "tubular form" of the packages 7 or of the film 4 means any cross-sectional form including a circular form or another form, and especially a rectangular or generally a polygonal form. Longitudinal sealing means 5, which are provided downstream from the form shoulder 3, seal the edges to the tubular film 4 together. After sealing, the bottom of the package 7 can be formed by a special bottom forming means, for example gusset-forming means. Finally, cross seals, extending preferably perpendicularly to the direction of flow of the tubular film 4, are applied, especially by means of cross-sealing means 6. These cross sealing means 6 apply to the package 7 not only an upper/second cross-seal closing the top of the package 7, but these cross-sealing means 6 advantageously also provide, preferably simultaneously a lower/first cross-seal defining the bottom of the subsequent, upstream package 7. The packages 7 produced are separated from one another by a cutting means 6, which are preferably incorporated into the cross-sealing means 6. Between the application of the bottom- and top-cross-seal of each package 7, the package 7 is filled with the product. Prior the application of the cross seal, the package 7/tubular film 4 is clamped and stretched by a stretching unit 10. Stretching of the tubular film 4 provides that the tubular film 4 is arranged flattened in the cross-sealing means 6, which is crucial for a straight and tight cross-seal.

Figure 2A:
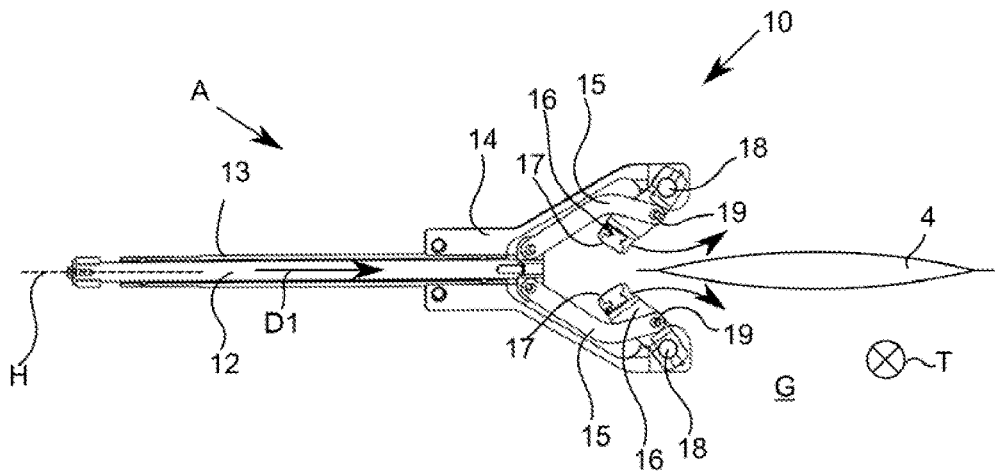
FIGS. 2A-2C schematically illustrate a gripping unit according to a preferred embodiment of the present invention and a method according to a preferred embodiment of the present invention.
Figure 2B:
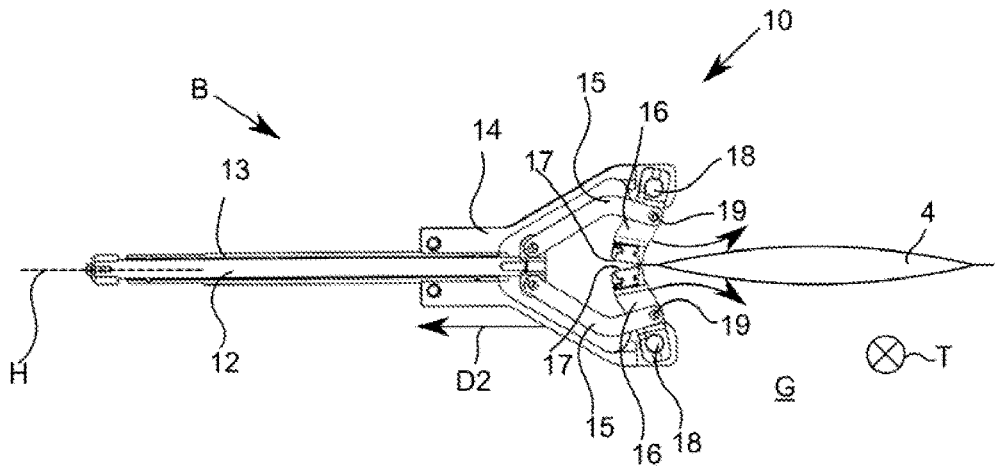
Figure 2C:
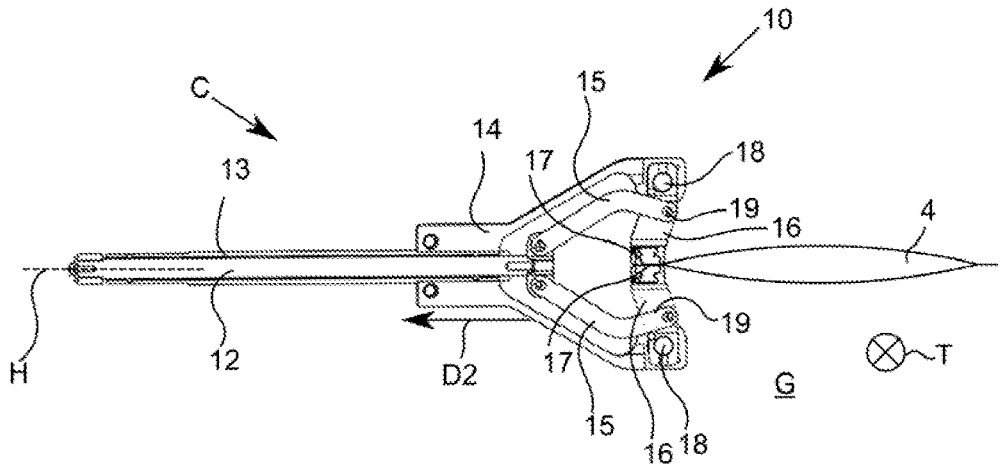

FIGS. 2A, 2B, and 2C schematically illustrate a gripping unit 10 according to a preferred embodiment of the present invention and a method according to a preferred embodiment of the present invention. FIG. 2A illustrates the gripping unit 10 in a remote position A. The preferably rubber-coated and/or roughened gripping surfaces 17 of the gripping fingers 16 are not in contact with each other and offer enough space to position a tubular film 4 between the gripping surfaces 17 and transport the tubular film 4 in a transport direction T. When the tubular film 4 is arranged between the gripping surfaces 17 of the gripping fingers 16, a first driving means (see FIG. 3) moves the moving means 12 in a first direction D1 along the center axis H of the moving means 12 relative to the gripping head 14. The moving means 12 is here provided as a driven rod. The first driving means is here provided as a pneumatic cylinder.

Here, the gripping head 14 partially encloses the coupling rods 15, which are rotatably connected to the moving means 12. The gripping fingers 16 are rotatably connected to the gripping head 14 at the first pivot points 18 and rotatably connected to the coupling rods 15 at the second pivot points 19. Due to the relative movement between the coupling rods 15 and the gripping head 14, the gripping fingers 16 rotate around the first pivot points 18 in a gripping plane G from the remote position A towards the intermediate position B.

FIG. 2B shows the gripping fingers 16 already rotated in the gripping plane G by the movement of the moving means 12 relative to the gripping head 14 in the first direction D1 into the intermediate positon B. The gripping surfaces 17 have been moved towards each other, but are still separated, so that the tubular film 4 is not clamped between the gripping fingers 16, but preferably in the direct vicinity of the tubular film 4. The position of the stretching unit 10 shown here is the intermediate position B. In this position, the moving means 12 has preferably reached a mechanical stop (not shown here, see FIG. 3), which impedes a further movement of the moving means 12 in the first direction D1.

Figure 3:
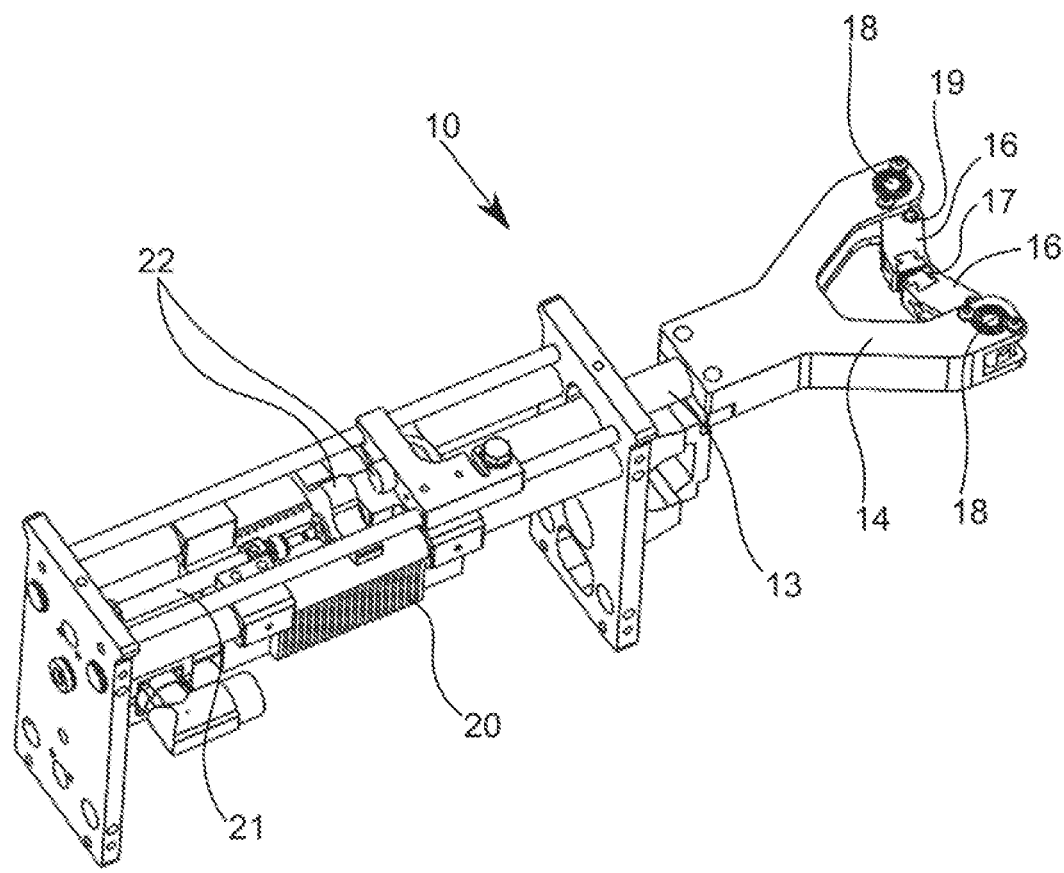
FIG. 3 schematically illustrates a gripping unit according to a preferred embodiment of the present invention.

After the gripping fingers have reached the intermediate positon B, the gripping head 14 is moved in the second direction D2, which is opposite but parallel to the first direction D1, by a second driving means (see FIG. 3). The second driving means is preferably a linear motor, preferably a servo motor and here connected with the gripping head 14 via a further moving means 3. The further moving means 3 is here a tube that is arranged parallel to the center axis H of the moving means 12 and preferably coaxially to the means 12 more preferably partially enclosing the moving means 12.

The movement of the gripping head 14 in the second direction D2 relative to the moving means 12 causes the gripping fingers 16 to further rotate until the tubular film 4 is clamped between the gripping surfaces 17, shown in FIG. 2C.

FIG. 2C shows the stretching unit 10 in the clamping position C. The tubular film 4 is clamped between the gripping fingers 16. For stretching the clamped tubular film 4, the gripping head 14 further moves in the second direction D2. All in all, this results in a smooth process of clamping and stretching of the tubular film 4, which leads to a significant increase in efficiency. Further, since the first driving means and the second driving means produce forces that are antiparallel to each other, the gripping unit 10 is operated with balanced forces, which advantageously prolongs the lifetime of the stretching unit 10.

Preferably, the tubular film 4 is released when the tubular film 4 is cross-sealed, i.e., when the cross-sealing means (see FIG. 1) clamps the tubular film 4 for cross-sealing. Preferably, for releasing the tubular film 4, the the gripping head 14 is moved in the first direction D1 by the second driving means. Preferably, the moving means 12 is fixed in its position, so that the movement of the gripping head 14 is relative to the driving means 12. Preferably, for fixing the moving means 12 in its position, the first driving means is utilized. Here, the movement of the gripping head 14 in the first direction D1 relative to the moving means 12 causes the gripping fingers 16 to rotate away from each other. Preferably, the stretching unit 10 is moved from the clamping position C to the intermediate position B. Preferably, the moving means 12 are moved in the second direction D2 relative to the gripping head 14, which leads to a further rotation of the gripping fingers 16 away from each other. The stretching unit is thereby preferably moved from the intermediate position B to the remote position A.

FIG. 3 schematically illustrates a gripping unit 10 according to a preferred embodiment of the present invention. In this illustration, the first driving means 21 and the second driving means 20 are shown. Here, the first driving means 21 is a pneumatic cylinder and the second driving means 20 is an electric linear servo motor. This has the advantage that the clamping and stretching movement can be carried out very quickly, powerfully and accurately. In contrast to driving the gripping unit 10 with pneumatic cylinders only, no separate additional sensor has to be installed to detect the spatial position of the gripping fingers 16. To the left and in the middle of the gripping unit 10, fastening devices are visible for fastening the gripping unit 10 in a flow-wrapper (see FIG. 1). FIG. 3 further shows the mechanical stop 22. The mechanical stop 22 limits the movement of the moving means 12 towards the tubular film. Here, the mechanical stop 22 comprises two flanges. When the moving means 12 is moved along its central axis, one flange of the mechanical stop 22 is moved. Here, the other flange of the mechanical stop 22 is fixed. The movement of the moving means 12 is here limited by a contact of the two flanges. Preferably, the position of the mechanical stop 22 can be adjusted to adapt the stretching unit 10 to different sizes and geometries of the tubular film. Preferably, the position of one of the flanges of the mechanical stop 22 can be adjusted to adapt the stretching unit 10 to different sizes and geometries of the tubular film.

REFERENCE SIGNS

1 Flow-wrapper
2 Form-fill tube
3 Form shoulder
4 Film/tubular film
5 Longitudinal sealing-means
6 Cross-sealing means and/or Cutting means
7 Package/Pouch
8 Frame/Housing
9 Reel
10 Gripping unit
12 Moving means
13 Further moving means
14 Gripping head
15 Coupling rod
16 Gripping finger
17 Gripping surface
18 First pivot point
19 Second pivot point
20 Second driving means
21 First driving means
22 Mechanical stop
A Remote position
B Intermediate position
C Clamping position
D1 First direction D2 Second direction
G Gripping plane
H Center axis
T Transport direction

The invention claimed is:

1. A stretching unit for clamping and stretching a tubular film in a flow-wrapper, the stretching unit comprising:
a gripping head;
two coupling rods attached to a moving means;
two gripping fingers, each of the two gripping fingers is attached to the gripping head and to one of the two coupling rods;
wherein the two gripping fingers are moved from a remote position to a clamping position by a relative linear movement between the gripping head and the moving means parallel to a center axis of the moving means; and
wherein the gripping head is connected with a driving means, wherein the driving means is an electric motor or a linear motor or a linear servo motor.

2. The stretching unit according to claim 1, wherein the two gripping fingers are moved from the remote position to the clamping position by a rotational movement of the two gripping fingers.

3. The stretching unit according to claim 1, wherein the two gripping fingers are attached to the gripping head by a first pivot point, and each of the two gripping fingers are attached to the two coupling rods by a second pivot point, wherein the relative linear movement between the gripping head and the moving means results in a rotational movement of the two gripping fingers.

4. The stretching unit according to claim 1, wherein the moving means is attached to a pneumatic cylinder.

5. The stretching unit according to claim 1, wherein the moving means is provided as a driven rod and/or wherein the gripping head is attached to the driving means via a further moving means, wherein the further moving means is a tube, the tube being arranged parallel to the moving means and at least partially coaxial with the moving means.

6. The stretching unit according to claim 1, wherein a movement of the moving means along the center axis of the moving means is limited by a mechanical stop.

7. A flow-wrapper comprising the stretching unit according to claim 1.

8. A method for clamping and stretching the tubular film in the flow-wrapper utilizing the stretching unit according to claim 1,
wherein
in a first step, moving the moving means of the stretching unit relative to the gripping head of the stretching unit in a first direction, towards the tubular film, and thereby moving the two gripping fingers from the remote position to an intermediate position;
in a second step, moving the gripping head relative to the moving means in a second direction, which is opposite to the first direction and thereby moving the two gripping fingers from the intermediate position to the clamping position and thereby clamping the tubular film;
wherein the tubular film is stretched by a further movement of the gripping head in the second direction.

9. The method according to claim 8, wherein the tubular film is not clamped between the gripping fingers in the remote position and in the intermediate position.

10. The method according to claim 8, wherein a rotation of the two gripping fingers in a gripping plane and the stretching is caused by a relative movement between the gripping head and the moving means parallel to the center axis of the moving means.

11. The method according to claim 8, wherein the gripping head is moved by the electric motor, the linear motor, or the linear servo motor and/or wherein the moving means is moved by a pneumatic cylinder.

12. The method according to claim 11, wherein a driving force of the electric motor and/or the linear motor and/or the linear servo motor is controlled depending on material properties and/or a geometry of the tubular film.

13. The method according to claim 8, wherein in the second step, the movement of the gripping head in the second direction is limited, wherein the movement of the gripping head in the second direction is limited by a path setting of the electric motor and/or the linear motor and/or the linear servo motor.

14. The method according to claim 8, wherein in the second step, the movement of the gripping head is limited.

15. The method according to claim 14, wherein the movement of the gripping head in the second direction is limited.

16. The method according to claim 14, wherein the movement is limited by a maximum force/torque setting of the electric motor and/or the linear motor and/or the linear servo motor.

17. A method for clamping and stretching the tubular film in the flow-wrapper utilizing the stretching unit according to claim 1,
wherein
in a first step, the two gripping fingers are rotated in a gripping plane orthogonal to a transport direction of the tubular film towards each other from the remote position to an intermediate position;
in a second step, the two gripping fingers are rotated in the gripping plane towards each other from the intermediate position to the clamping position, wherein the tubular film is clamped between the two gripping fingers, wherein the two gripping fingers are linearly moved in the gripping plane to stretch the clamped tubular film.

18. A method for clamping and stretching a tubular film in a flow-wrapper utilizing a stretching unit, the stretching unit comprising: a gripping head; two coupling rods attached to a moving means; two gripping fingers, each of the two gripping fingers are attached to the gripping head and to one of the coupling rods;
wherein the two gripping fingers are moved from a remote position to a clamping position by a relative linear movement between the gripping head and the moving means parallel to a center axis of the moving means;
wherein, in a first step, the method comprises: moving the moving means of the stretching unit relative to the gripping head of the stretching unit in a first direction, towards the tubular film, and thereby moving the two gripping fingers from the remote position to an intermediate position;
wherein in a second step, the method comprises: moving the gripping head relative to the moving means in a second direction, which is opposite to the first direction and thereby moving the two gripping fingers from the intermediate position to the clamping position and thereby clamping the tubular film;
wherein the tubular film is stretched by a further movement of the gripping head in the second direction;

wherein the gripping head is moved by an electric motor, a linear motor, or a linear servo motor and/or wherein the moving means is moved by a pneumatic cylinder; and wherein a driving force of the electric motor and/or the linear motor and/or the linear servo motor is controlled depending on material properties and/or a geometry of the tubular film.

19. The method according to claim 18, wherein in the second step, the movement of the gripping head in the second direction is limited, wherein the movement of the gripping head in the second direction is limited by a path setting of the electric motor and/or the linear motor and/or the linear servo motor.

20. The method according to claim 18, wherein in the second step, the movement of the gripping head is limited, the movement is limited by a force/torque setting of the electric motor and/or the linear motor and/or the linear servo motor.

* * * * *